United States Patent [19]

Bell

[11] 3,812,726

[45] May 28, 1974

[54] VELOCITY RESPONSIVE APPARATUS

[75] Inventor: Lon E. Bell, Altadena, Calif.

[73] Assignee: Technar Incorporated, Pasadena, Calif.

[22] Filed: Sept. 28, 1972

[21] Appl. No.: 293,209

[52] U.S. Cl. .................................... 73/503, 73/514
[51] Int. Cl. ....................... G01p 7/00, G01p 15/02
[58] Field of Search ............ 73/514, 515, 492, 503; 200/61.45; 116/114 AH; 200/164 R

[56] References Cited
UNITED STATES PATENTS

| 3,392,250 | 7/1968 | Ziegler et al. | 200/164 R |
| 3,471,668 | 10/1969 | Wilkes | 73/514 UX |
| 3,546,925 | 12/1970 | Barton | 73/514 X |

*Primary Examiner*—James J. Gill
*Attorney, Agent, or Firm*—Ernest D. Buff; Jonathan Plaut

[57] ABSTRACT

A velocity measuring apparatus is provided with means for increasing the rotational moment of inertia of a roller which displaces a band of electroconductive material against a preselected resisting force and into contact with a conductive member. The extent of displacement necessary for contacting the band with the conductive member is thereby decreased without changing the magnitude of the preselected resisting force. The velocity measuring apparatus is highly reliable in operation and is sufficiently compact to be economically installed in a limited space.

14 Claims, 3 Drawing Figures

3,812,726

VELOCITY RESPONSIVE APPARATUS

BACKGROUND OF THE INVENTION

1. Field of the Invention

This invention relates to velocity measuring apparatus, and more particularly to a compact crash sensor associated with an inflatable bag restraint system disposed within a motor vehicle subject to impact, for transmitting an electrical current from a power source to a gas source of the system upon impact of the vehicle.

2. Description of the Prior Art

Inflatable bag restraint systems have been recently developed which should significantly decrease the number of fatalities and serious injuries resulting from motor vehicle accidents. Such systems generally include a source of pressurized gas disposed within a vehicle and a crash sensor electrically connected with the gas source for transmitting an electrical signal thereto when the vehicle is involved in a collision. Gas released from the gas source upon receipt of the electrical signal flows into an inflatable bag, which is rapidly filled thereby.

One of the problems heretofore encountered in adapting inflatable bag restraint systems for use in motor vehicles is the limited space available for installation of the crash sensor. The space which is available is located in the bumper cavity and is limited by the relatively short distance between the front and rear faces thereof. Crash sensors proposed for installation within that space generally comprise a roller which upon impact of the vehicle is horizontally displaced in a forward direction against the resisting force of a metal band connected to a power source until the band contacts a conductive member electrically connected to the gas source. Sensors of this type are disclosed in U.S. Pat. No. 3,688,063 to Bell. The roller displacement necessary for contact between the band and the conductive member is substantially inversely proportional to the strength of the band and the magnitude of the resisting force provided thereby. But, up to the present time, these parameters have not been easy to control. The roller's displacement must be short enough for proper inflation of the bag during collision at relatively low velocities, and yet be long enough to prevent inadvertent inflation due to high acceleration forces caused by vibrations and other transient conditions not resulting from a collision of the vehicle. Moreover, the band must be strong enough to withstand forces developed during collision of the vehicle at relatively high velocities, and, at the same time, provide a resisting force small enough to permit the roller displacement necessary for inflation at relatively low impact velocities. If the band is made sufficiently strong to withstand forces resulting from high velocity collisions, the resisting force is too high for proper inflation of the bag at low impact velocities. When the resisting force of the band is decreased sufficiently for inflation at low velocity collisions, the displacement distance of the roller must be considerably increased to prevent inadvertent inflation by acceleration forces unrelated to collision of the vehicle. As a result, the sensor cannot be economically installed between the front and rear faces of the bumper. Moreover, the reduced strength of the band makes the sensor less reliable in operation. For the above reasons, crash sensors of the type described generally result in lower reliability factors and higher installation costs than are considered to be commercially acceptable.

SUMMARY OF THE INVENTION

The present invention provides a compact velocity measuring apparatus which is highly reliable in operation and which can be economically installed in a limited space such as that located between adjacent faces of the front bumper in a motor vehicle subject to impact. Generally, the apparatus includes a roller which displaces a band of electroconductive material against a preselected resisting force and into contact with a conductive member. It has been found that by providing the apparatus with means for increasing the rotational moment of inertia of the roller, the extent of displacement necessary for contacting the band with the conductive member is decreased without changing the magnitude of the preselected resisting force. Since the length of the band varies directly with the displacement necessary for contacting the band with the conductive member, the length of the band is reduced. Due to the decreased length of the band, its overall rigidity and toughness is increased, with the result that band breaks are minimized. Accordingly, the velocity measuring apparatus of the present invention is far more compact, safer in operation and less expensive to manufacture and install then velocity measuring apparatus wherein the roller is not equipped with means for increasing its rotational moment of inertia.

BRIEF DESCRIPTION OF THE DRAWINGS

The invention will be more fully understood and further advantages will become apparent when reference is made to the following detailed description and the accompanying drawings in which.

DESCRIPTION OF THE PREFERRED EMBODIMENT

Most types of velocity measuring apparatus conventionally employed in moving vehicles include a movable mass which displaces an electroconductive material against a preselected resisting force and into contact with a conductive member. As a consequence, the invention will function with all such types of velocity measuring apparatus. For illustrative purposes, the invention is described in connection with an inflatable bag restraint system disposed within a motor vehicle subject to impact. However, the invention can be employed with other types of velocity responsive systems such as those employed to guide missiles and rockets, and to detonate falling objects such as bombs. In each of these systems, the need for a compact, inexpensive and highly reliable velocity measuring apparatus is readily apparent. Accordingly, the invention is intended to encompass modifications of the preferred embodiment wherein the extent of displacement necessary for contacting the electroconductive material with the conductive member is decreased by means for increasing the rotational moment of inertia of the movable mass.

Figure 1:
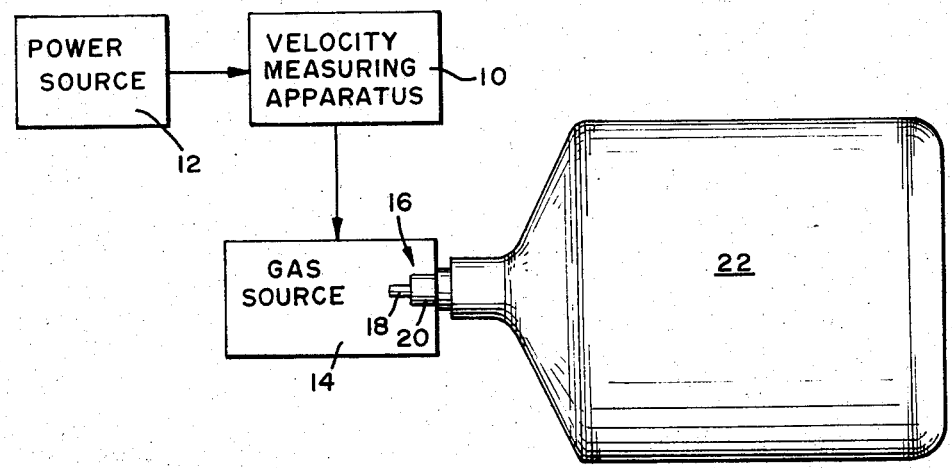
FIG. 1 is a diagrammatic representation of a preferred type of velocity measuring apparatus adapted for use with an inflatable bag restraint system in a motor vehicle.

Referring to FIG. 1 of the drawings, the velocity measuring apparatus 10 is diagrammatically illustrated in connection with an inflatable bag restraint system disposed within a motor vehicle (not shown) subject to impact. The apparatus 10 is electrically connected in series with and between a power source 12 and a gas source 14. A gas releasing means, generally indicated at 16 and comprising a squib 18 and a detonator 20, is disposed within the gas source 14 for creating an outlet therein upon receipt of an electrical signal. The outlet communicates with an inflatable bag 22. Upon collision of a vehicle in which the system is disposed, the velocity measuring apparatus 10 transmits an electrical signal from the power source 12 to the gas releasing means 16. Squib 18 is ignited, detonator 20 explodes, and gas flows from the gas source 14 through the outlet (not shown) and into the bag 22 which inflates to protect passengers or other mobile objects of the vehicle.

Figure 2:
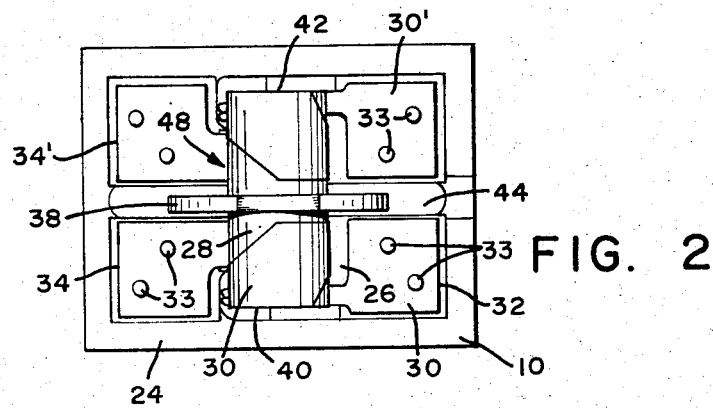
FIG. 2 is a plan view of the velocity measuring apparatus.
Figure 3:
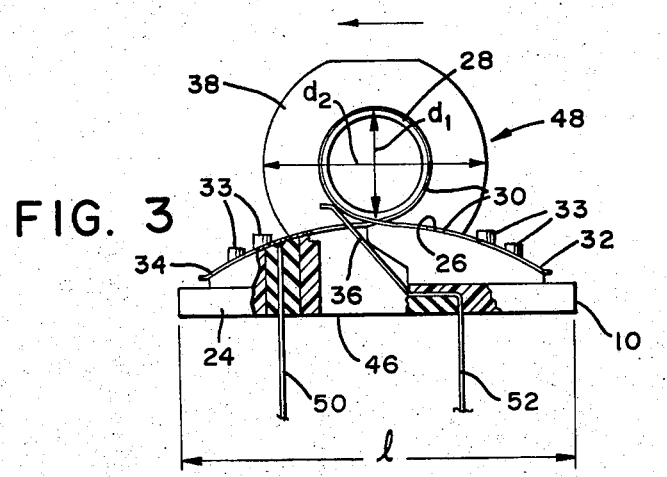
FIG. 3 is a side elevation, partly in section of the velocity measuring apparatus of FIG. 2.

In FIGS. 2 and 3, there is illustrated one form of the velocity measuring apparatus of this invention. Other forms of the velocity measuring apparatus can also be used. The velocity measuring apparatus shown in FIGS. 2 and 3 should therefore be interpreted as illustrative and not in a limiting sense. Such apparatus 10 has a base 24 and a top (not shown) constructed of plastic or other suitable non-conductive material and collectively defining a chamber (not shown). The base 24 has a guide surface 26 thereon disposed within the chamber. A roller 28 which is preferably a right circular cylinder but may also be an equilateral triangular polyhedron or other cylindrical member having a polygonal exterior surface, is adapted for movement over the guide surface 26 and within the chamber. The roller 28 may be either solid or hollow, as desired, and may be constructed of a non-conductive material such as plastic or the like. A band 30 of flexible, tensioned electroconductive material such as stainless steel, berylium-copper or other suitable flat spring material is wrapped around the roller 28. The band 30 is passed around the roller 28 so that ends 32 and 34 extend in opposite directions therefrom. Each of the ends 32 and 34 is fixed to and spaced apart on the guide surface 26 by bosses 33. When the band 30 is tightly drawn around the roller 28 and secured to the guide surface 26 in the above manner, it provides a resisting force against which the roller 28 acts.

A compliant, conductive member 36, constructed of brass, gold plated copper or other flexible non-corrosive conductive material, is disposed in the guide surface 26 for selective contact with band 30. The member 36 is located between ends 32 and 34 of the band 30 and spaced apart from the roller 28. If the roller 28 is displaced along the guide surface 26 in the direction of the arrow, band 30 is brought into contact with member 36, which "wipes" (rubs) against band 30. The wiping action increases the contact force between the member 36 and the band 30 and produces an excellent electrical connection therebetween.

As previously noted, the displacement distance necessary for contact between the band and the conductive member of prior velocity measuring switches has been relatively large. If the displacement distance is reduced without increasing the resisting force of the band, the time interval during which the band is displaced into contact with the conductive member becomes extremely short. Thus, the band is displaced into contact with the conductive member by high acceleration forces occurring during extremely short time intervals. Such high acceleration forces are frequently present in the environment to which the apparatus is exposed. For example, when the apparatus is used in connection with an inflatable bag restraint system, disposed within a motor vehicle, it is frequently subjected to high acceleration forces such as vibrations and other transient conditions which do not result from a collision of the vehicle. If the displacement distance is decreased without increasing the resisting force of the band, the time interval during which the band is displaced into contact with the conductive member becomes insufficient to prevent inadvertent inflation of the bag by high acceleration forces of extremely short duration. When the resisting force of the band is increased to prevent inadvertent inflation due to high acceleration forces of extremely short duration, the apparatus becomes less sensitive to forces having a relatively long duration which result from a collision of the vehicle.

The present invention provides a unique means for decreasing the length of the band without changing the magnitude of the resisting force provided thereby or otherwise decreasing the sensitivity of the apparatus. Surprisingly, it has been found that by increasing the rotational moment of inertia of the roller 28, the extent of displacement necessary for contacting the band 30 with the conductive member 36 is decreased without changing the magnitude of the force necessary to effect such contact. Further, due to the increased rotational moment of inertia of the roller 28, the band 30 is not displaced into contact with the member 36 by high acceleration forces of extremely short duration. By varying the rotational moment of inertia of the roller 28 in the manner hereinafter described, the velocity measuring apparatus 10 can be made responsive to changes in velocity greater than a preselected magnitude which occur during a preselected period of time.

As preferred, the rotational moment of inertia of the roller 28 is increased by mounting a flywheel 38 thereon. Such flywheel 38 may be constructed of brass, lead, plastic or other conductive or non-conductive material which is relatively heavy and dense. As shown in FIG. 3, the flywheel is mounted intermediate ends 40 and 42 of roller 28. The flywheel 38 can be integrally joined with the roller 28 by an injection molding operation, or fixedly secured thereto by a suitable adhesive such as an epoxy resin or the like. In order to permit rotary movement of the roller 28 and flywheel 38, a groove 44 is provided in base 24 adjacent guide surface 26. The flywheel 38 moves with the groove 44 during displacement of the roller 28. Alternatively, the rotational moment of inertia of the roller 28 can be increased by increasing the diameter, $d_1$, thereof.

The amount by which the diameter, $d_1$, of the roller 28 is increased, or alternatively, the size of the flywheel 38 employed, depends upon the magnitude and duration of forces to which the apparatus 19 is desired to respond, the resisting force of the band 30, the ratio of rotational inertia to translational inertia of the combined unit, generally indicated at 48, formed by the roller 28 and the flywheel 38, and the extent of displacement necessary for contacting the band 30 with the conductive member 36. Advantageously, only a small increase in the size of the unit 48 is required to effect an increase in the rotational moment of inertia sufficient to substantially reduce the extent of displacement of the band 30. A representative example of the apparatus 10 has a roller 0.7 inch long having a diameter, $d_1$, of 0.314 inch, and a flywheel 0.05 inch long having a diameter, $d_2$, of 0.75 inch. The ratio of rotational to translational inertia for unit 48 is about 7. Band 30 has an average resisting force of about 18 times the weight of the roller and is displaced 0.35 inch before making contact with conductive member 36. Thus constructed, the apparatus 10 has an overall length, $l$, of 1.2 inches and is responsive to changes in velocity greater than about 15 feet per second which occur during a time interval up to about 40 milliseconds. Of course, the apparatus 10 could be differently constructed so as to respond to forces resulting from changes in velocity having different magnitude and duration than those discussed above. Hence, the apparatus 10 can have a roller 28 about 0.05 to 2 inches long having a diameter of about 0.02 to 1 inch, a flywheel 38 about 0.0005 to 0.2 inch long having a diameter of about 0.02 to 2 inches, a band 30 which provides a resisting force ranging from about 0.01 to 1,000 times the weight of the unit 48, a rotational moment of inertia to translational moment of inertia ratio for the unit 48 of about 0.33 to 10,000, and a displacement distance of about 0.05 to 2 inches required for contact between band 30 and conductive member 36.

Due to the decreased length of band 30 afforded by increasing the rotational moment of inertia of the roller 28, the overall rigidity of the band 30 is increased. As a result, band breaks are minimized for apparatus wherein the guide surface 26 is substantially horizontal. It has been further discovered that by constructing the guide surface 26 in a curved shape, band breaks are virtually eliminated. For this reason, a curved guide surface 26, such as the arcuate shaped surface shown in FIG. 3, is preferred.

In the event that the guide surface 26 has an arcuate shape, the center of gravity of the roller 28 is shifted from the axis of revolution thereof in order to maintain maximum sensitivity of the roller 28 to forces parallel with the edge 46 of base 24. For example, a portion of the flywheel 38 can be removed so as to cause the center of gravity of the unit 48 to move along a path horizontal to edge 46 during movement of the roller 28. Alternatively, the center of gravity of the unit 48 can be shifted from the axis of revolution thereof by fixedly mounting thereon a weighting means such as a load weight (not shown) or by drilling one or more holes therein. The manner of constructing unit 48 with a center of gravity which moves in a path of the type described will be obvious to those skilled in the art.

In operation, the apparatus 10 is mounted between the front and rear faces provided by the front bumper of a motor vehicle subject to impact. End 34 of band 30 is electrically connected via terminal 50 to power source 12. Conductive member 36 is electrically connected via terminal 52 to the gas releasing means 16 of gas source 14. During normal operation of the vehicle, the band 30 exerts a force on the roller 28 which holds the roller 28 relatively close to the end 32 of the band 30. Upon impact of the vehicle, forces greater than the preselected resisting force provided by the rotational moment of inertia of the unit 48 and the resisting force of band 30 move the unit 48 along guide surface 26 in the direction of the arrow until band 30 is displaced into contact with conductive member 36, giving a firing command. Such command, in the form of an electrical signal, is transmitted from power source 12 through terminal 50, band 30 and terminal 52 to the gas releasing means 16. Squib 18 is ignited and detonates the detonator 20 upon receipt of the electrical signal, whereby an outlet (not shown) is formed in communication with gas source 14 and the interior portion of the inflatable bag 22. Gas flows from the gas source 14 through the outlet and into the bag 22 which is rapidly disposed between hard portions of the vehicle and passengers or other mobile objects contained therein.

The apparatus 10 which has been disclosed herein can, of course, be modified in numerous ways without departing from the scope of the invention. A plurality of bands can be employed to increase the reliability of the apparatus 10 and to make it compatible with the electrical circuit of the system wherein it is disposed. Hence, as shown in FIG. 2, a second band 30' is adapted for displacement by roller 28 along guide surface 26 and into contact with a second conductive member (not shown). End 34' of band 30' is electrically connected to the power source 14 in the same manner as end 34. The second conductive member can be connected in series with and between the power source 14 and the gas releasing means 16 and in parallel with conductive member 36 for increased reliability, or in series with each of the conductive member 36, gas releasing means 16 and power source 14 and between the gas releasing means 16 and power source 14 for compatability with diagnostic or other logic functions of the inflatable bag restraint system. Each of the conductive members can be provided with a bifurcated tip portion (not shown) to increase its wiping efficiency.

In another embodiment, not shown in the drawing, the apparatus 10 may be made more sensitive to acceleration forces applied thereto over a broad range of angles relative to its length if (1) a plurality of rollers are used to displace a plurality of bands in the direction of the applied forces and at different angles relative to the length, $l$, of the apparatus, and (2) each of the rollers have its center of gravity shifted off the axis of revolution thereof so that the center of gravity moves along a path parallel to that of the acceleration force applied thereto. Moreover, any one or more of such rollers could be adapted to incorporate a plurality of the flywheels. These and other modifications are intended to fall within the scope of the present invention.

Having thus described the invention in rather full detail, it will be understood that these details need not be strictly adhered to but that various changes and modifications may suggest themselves to one skilled in the art, all falling within the scope of the invention as defined by the subjoined claims.

I claim:

1. In a velocity responsive apparatus having a roller for displacing a band of a movable electroconductive material for a preselected distance against a preselected resisting force and into contact with a conductive member, the improvement which comprises providing said apparatus with a curved guide surface adapted for movement of said roller thereover, means for shifting the center of gravity of said roller off the axis of revolution thereof so that said center of gravity is caused to move along a path parallel to the path of acceleration forces greater than said preselected resisting force and means for increasing the rotational moment of inertia of said roller, whereby the extent of displacement necessary for contacting said band with said conductive member is decreased without changing the magnitude of said preselected resisting force.

2. Apparatus as recited in claim 1 wherein said apparatus has a base and a top which define an interior chamber, said base has said guide surface thereon, and said band of said movable electroconductive material is a flexible, tensioned band having opposite ends fixed to and spaced apart on said guide surface, said band being passed around said roller so that said ends extend in opposite directions therefrom, whereby said band exerts a resisting force on said roller.

3. Apparatus as recited in claim 2 wherein said conductive member is disposed in said guide surface between said ends and spaced apart from said roller, whereby acceleration forces greater than a preselected resisting force displace said roller until said band is brought into contact with said conductive member.

4. Apparatus as recited in claim 1 wherein the ratio of the rotational moment of inertia to the translational moment of inertia of said roller ranges from about 0.33 to 10,000.

5. Apparatus as recited in claim 1 wherein said means for increasing the rotational moment of inertia of said roller is a flywheel.

6. Apparatus as recited in claim 5 wherein the end of said conductive member which contacts said band is bifurcated.

7. A velocity responsive apparatus, comprising:
a. housing means having a base and a top which define an interior chamber;
b. said base having a curved guide surface thereon disposed within said chamber;
c. a roller adapted for movement over said guide surface and within said chamber;
d. a band of flexible, tensioned, electroconductive material having opposite ends fixed to and spaced apart on said guide surface, said band being passed around said roller so that said ends extend in opposite directions therefrom, whereby said band exerts a resisting force on said roller;
e. a conductive member disposed in said guide surface between said ends and spaced apart from said roller, whereby acceleration forces greater than a preselected resisting force move said roller over said guide surface until said band is displaced into contact with said conductive member;
f. means for increasing the rotational moment of inertia of said roller, whereby the extent of displacement necessary for contacting said band with said conductive member is decreased without changing the magnitude of said preselected resisting force; and means for shifting the center of gravity of said roller off the axis of revolution thereof so that said center of gravity is caused to move along a path parallel to the path of said acceleration forces.

8. Apparatus as recited in claim 7 wherein said conductive member is compliantly disposed in said base, whereby said conductive member wipes said band upon contact therewith.

9. Apparatus as recited in claim 7 wherein said guide surface has an arcuate shape.

10. Apparatus as recited in claim 9 wherein the ratio of the rotational moment of inertia to the translational moment of inertia is about 7.

11. Apparatus as recited in claim 7, including at least a second band of flexible, tensioned electroconductive material having opposite ends fixed to and spaced apart on said guide surface, said second band being passed around said roller so that said ends extend in opposite directions therefrom, whereby said second band exerts a resisting force on said roller.

12. Apparatus as recited in claim 7 wherein said means for increasing the rotational moment of inertia of said roller is a flywheel.

13. Apparatus as recited in claim 7 wherein said roller has a plurality of flywheels mounted thereon.

14. Apparatus as recited in claim 7, wherein said apparatus is associated with an inflatable bag restraint system disposed within a motor vehicle subject to impact.

* * * * *

PO-1050
(5/69)

UNITED STATES PATENT OFFICE
CERTIFICATE OF CORRECTION

Patent No. 3,812,726          Dated May 28, 1974

Inventor(s) Lon E. Bell

It is certified that error appears in the above-identified patent and that said Letters Patent are hereby corrected as shown below:

Column 2, line 28, "then" should read -- than --.
Column 4, line 62, "19" should read -- 10 --.
Column 7, line  9, "said" should read -- a --;
           line 18, "a" should read -- said --.
Column 8, line 36, "7" should read -- 12 --.

Signed and sealed this 1st day of October 1974.

(SEAL)
Attest:

McCOY M. GIBSON JR.
Attesting Officer

C. MARSHALL DANN
Commissioner of Patents